US012638074B2

(12) United States Patent
Manzoni et al.

(10) Patent No.: US 12,638,074 B2
(45) Date of Patent: May 26, 2026

(54) LUBRICATION SYSTEM FOR A GEAR ASSEMBLY

(71) Applicant: GE Avio S.r.l., Rivalta di Torino (IT)

(72) Inventors: Miriam Manzoni, Rivalta di Torino (IT); Michele Gravina, Milan (IT); Federico Leonardi, Vinovo (IT); Alessandro Anderlini, Poggibonsi (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/510,014

(22) Filed: Nov. 15, 2023

(65) Prior Publication Data

US 2025/0003482 A1      Jan. 2, 2025

(30) Foreign Application Priority Data

Jun. 30, 2023    (IT) ......................... 102023000013707

(51) Int. Cl.
F16H 57/04          (2010.01)
(52) U.S. Cl.
CPC ..... F16H 57/0456 (2013.01); F16H 57/0479 (2013.01)
(58) Field of Classification Search
CPC ......................... F16H 57/0456; F16H 57/0479
See application file for complete search history.

(56) References Cited

U.S. PATENT DOCUMENTS

| | | | | |
|---|---|---|---|---|
| 3,738,452 | A | * | 6/1973 | Hausinger ........... F16H 57/0421 184/6.12 |
| 4,271,928 | A | * | 6/1981 | Northern ................. B64C 27/12 184/6.12 |
| 4,429,587 | A | * | 2/1984 | Finn, III ............. F16H 57/0447 184/6.12 |
| 4,667,774 | A | * | 5/1987 | Roberge .................... F16H 1/14 184/6.12 |
| 4,976,335 | A | * | 12/1990 | Cappellato ................ F16N 7/40 184/7.4 |
| 5,189,929 | A | * | 3/1993 | Chory ................. F16H 57/0482 184/6.12 |
| 5,242,033 | A | * | 9/1993 | Toraason ............ F16H 57/0456 184/6.12 |

(Continued)

FOREIGN PATENT DOCUMENTS

| | | | | |
|---|---|---|---|---|
| EP | 4502345 A1 | * | 2/2025 | ......... F16H 57/0435 |
| FR | 3127024 A1 | | 3/2023 | |

(Continued)

*Primary Examiner* — Michael A Riegelman
(74) *Attorney, Agent, or Firm* — Venable LLP; Peter T. Hrubiec; Michele V. Frank

(57) ABSTRACT

A lubrication system for a gear assembly. The gear assembly includes a first gear and a second gear. The first gear and the second gear mesh with each other at a mesh. The lubrication system includes one or more lubricant injectors. The one or more lubricant injectors include one or more first lubricant outlets directed to the mesh. The one or more first lubricant outlets supply a first portion of lubricant to the mesh. The one or more lubricant injectors include one or more second lubricant outlets directed to a location that is different than the mesh. The one or more second lubricant outlets supply a second portion of lubricant to the location different than the mesh.

20 Claims, 3 Drawing Sheets

(56)     References Cited

U.S. PATENT DOCUMENTS

| | | | | |
|---|---|---|---|---|
| 8,876,647 | B2 * | 11/2014 | Gallet | F16H 57/0423 |
| | | | | 184/6.12 |
| 10,634,233 | B1 * | 4/2020 | Smith | F16H 57/0417 |
| 11,112,001 | B2 | 9/2021 | Dombek et al. | |
| 11,187,316 | B2 * | 11/2021 | Wilcox | F16H 57/0442 |
| 11,326,555 | B2 * | 5/2022 | Uhkoetter | F16H 57/046 |
| 11,512,647 | B2 * | 11/2022 | Di Giovanni | F02C 7/36 |
| 11,674,440 | B2 | 6/2023 | Polly | |
| 11,713,804 | B2 * | 8/2023 | Olson | F16H 57/0427 |
| | | | | 184/6.12 |
| 11,754,054 | B2 * | 9/2023 | Pedersen | F16H 57/0435 |
| | | | | 184/4 |
| 11,994,204 | B2 * | 5/2024 | Molesini | F16H 57/0495 |
| 2005/0034925 | A1 * | 2/2005 | Flamang | F16H 57/0434 |
| | | | | 184/6.12 |
| 2006/0076193 | A1 * | 4/2006 | Ruther | F16H 57/0456 |
| | | | | 184/6.12 |
| 2011/0024236 | A1 * | 2/2011 | Yano | F03D 80/70 |
| | | | | 184/6.12 |
| 2013/0225353 | A1 * | 8/2013 | Gallet | F16H 57/0486 |
| | | | | 475/159 |
| 2020/0284203 | A1 * | 9/2020 | Simon | F16H 57/0426 |
| 2021/0108714 | A1 * | 4/2021 | Lei | F16H 57/0495 |
| 2022/0049765 | A1 * | 2/2022 | Molesini | F16H 57/0479 |
| 2022/0213956 | A1 * | 7/2022 | Mouly | F16H 57/046 |
| 2022/0221047 | A1 | 7/2022 | Roske | |
| 2022/0372912 | A1 * | 11/2022 | Kubiak | F16H 57/0482 |
| 2022/0389873 | A1 * | 12/2022 | Uhkoetter | F02C 7/36 |
| 2022/0397040 | A1 | 12/2022 | Molesini et al. | |
| 2024/0133459 | A1 * | 4/2024 | Jallat | F16H 57/0409 |
| 2025/0003482 | A1 * | 1/2025 | Manzoni | F02C 7/36 |

FOREIGN PATENT DOCUMENTS

| | | | |
|---|---|---|---|
| FR | 3127025 | A1 | 3/2023 |
| FR | 3129436 | A1 | 5/2023 |
| FR | 3129690 | A1 | 6/2023 |
| FR | 3130747 | A1 | 6/2023 |
| FR | 3130875 | A1 | 6/2023 |

* cited by examiner

LUBRICATION SYSTEM FOR A GEAR ASSEMBLY

CROSS REFERENCE TO RELATED APPLICATIONS

The present application claims the benefit of Italian Patent Application No. 102023000013707, filed on Jun. 30, 2023, which is hereby incorporated by reference herein in its entirety.

TECHNICAL FIELD

The present disclosure relates generally to lubrication systems, for example, for gear assemblies in turbine engines.

BACKGROUND

A turbine engine generally includes a fan and a core section arranged in flow communication with one another. A gear assembly transfers torque and power from one rotating component to another rotating component (e.g., from the core section to the fan, or to provide power to auxiliary components of the turbine engine or portions of an aircraft). A lubrication system provides lubricant to one or more components of the gear assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
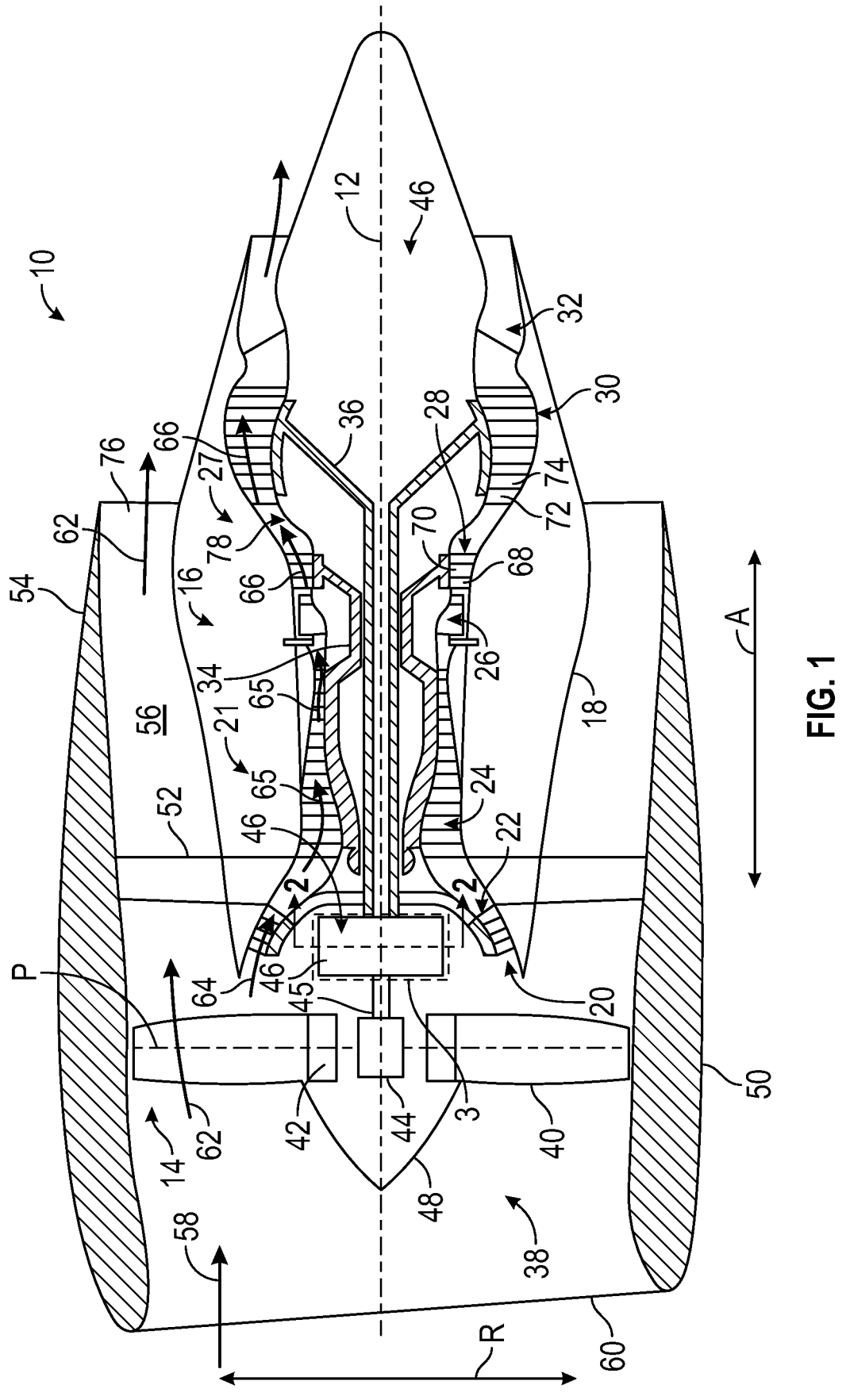
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the term "mesh" or "meshing" refers to a location between two gears at which gear teeth of the two gears become intertwined, or otherwise become mated.

As used herein, the term "in-mesh" or "in-mesh side" refers to a location of a meshing between two gears at which, according to the direction of rotation of the gears, the gear teeth of both gears get close and enter the meshing point (e.g., enter the mesh). When lubricating in-mesh, the lubricant contacts the gear teeth before the gear teeth mesh.

As used herein, the term "out-of-mesh" or "out-of-mesh side" refers to a location of a meshing between two gears at which, according to the direction of rotation of the gears, the gear teeth of both gears leave the meshing point (e.g., separate from the mesh). When lubricating out-of-mesh, the lubricant contacts the gears after the gear teeth have separated from the meshing point.

As used herein, "friction" of two rotating components occurs at the interface of contacts between the two rotating components and is the result of the contacts of the two rotating components sliding and rolling with respect to each other. The friction is a function of the geometrical configuration and operative conditions (e.g., transmitted power through the two rotating components).

As used herein, "windage" of a rotating component occurs due to the interaction of the rotating component with the fluids (e.g., air or lubricant) surrounding the rotating component. The windage is caused by drag of the rotating component within the fluids, and is a function of the geometrical configuration and operative conditions. One of the main drivers of the windage is the amount of lubricant interacting with the rotating component.

A gear assembly for a turbine engine or other applications is used to transmit power and motion from one rotating component to another rotating component. For example, a turbine engine can include a gearbox assembly that transmits power from a shaft of a core turbine engine to a fan of the turbine engine. Rotating parts (e.g., the gears), however, are not 100% efficient. During operation of the gear assembly, the gears and the bearings generate power losses due to friction (F) (e.g., between the gear teeth of the gears) and interaction of the rotating components with the fluids (e.g., lubricant) inside the gear assembly. The interaction of the rotating components with the fluids is referred to as windage (W) and is caused by drag of the rotating component within the fluids. The friction and the windage produce heat within the gear assembly that needs to be dissipated. Lubricant, such as, by way of non-limiting example, oil, can be used to lubricate and to cool the gear assembly components (e.g., the gears and the bearings) through dedicated lubricant streams directed to the bearings and the meshing points of the gears. The amount of lubricant needed is determined based on the maximum delta temperature (dT) that each component can sustain before becoming damaged (e.g., scuffing).

For example, the maximum delta temperature (dT) is based on the material properties of the components, as well as the amount of power losses from friction and windage (e.g., fluidic losses) that heat up (e.g., increase the temperature of) the components. The heat from friction of the mesh is localized to the mesh, while windage is not localized, but more dispersed in the environment surrounding the gears. Mesh power losses are determined based on the power losses from the friction and from the windage. The power losses from the friction are a function of a geometrical configuration and an operating condition (e.g., transmitted power). The power losses from the windage are mainly driven by the geometrical configuration, operating conditions, and an amount of lubricant interacting with the gear teeth at the engaging meshing point(s). For both standard power gear trains and epicyclic gear trains, typically, the amount of lubricant (in terms of mass flow rate $\dot{m}_{lubricant}$) is determined as a function of the heat (e.g., power) losses of the mesh (e.g., friction+windage), the specific heat capacity of the lubricant ($C_p$), and the maximum delta temperature (dT) which is set in order to avoid gear damages. For example, the mass flow rate $\dot{m}_{lubricant}$ is given by (F+W)/ ($C_p$*dT).

Current lubrication systems typically are configured to deliver the lubricant to an in-mesh side, meaning that the entire lubricant flow is entering inside the meshing point, thus contributing to an increase in the power losses due windage. Lubricant is delivered with dedicated jets typically disposed radially or tangentially with respect to the gear teeth surface. For standard power gear trains, a possible solution to reduce power losses due to windage is to split the lubricant flow to the mesh between the in-mesh side (e.g., for lubrication) and the out-of-mesh side (e.g., for cooling) such that only the in-mesh part of the lubricant flow contributes to increase windage. For epicyclic gear trains, a proper difference between the in-mesh side and out-of-mesh cannot be substantiated because the space between the rotating gears is highly confined. For example, in an epicyclic gear train that includes two or more planet gears meshing with a sun gear, an out-of-mesh lubrication for a first sun-planet mesh can be seen as an in-mesh lubrication for a second sun-planet mesh according to the gear rotation.

Accordingly, the present disclosure provides for an improved lubrication system in which lubricant needed to remove friction heat is provided to the meshing point, while windage cooling lubricant is provided elsewhere. The gears are cooled through convection and conduction with the surrounding environment and components while avoiding superfluous lubricant interaction with the gear teeth at the meshing point. Such a configuration of the lubrication system reduces losses due to the gear teeth interacting with less fluid, as compared to lubrication systems without the benefit of the present disclosure. The windage cooling lubricant can be provided to one or more different areas or different components of the gear assembly, such as, for example, the lateral faces of the gears, the rotating shafts (e.g., the input shaft and/or the output shaft of the gear assembly), the gear assembly housing, the bearings, or the like, or other components, such as, for example, sumps. The lubrication system of the present disclosure can be utilized in any type of gear assembly. In some embodiments, the lubrication system is utilized for power gearboxes in which the bearing speeds are high (e.g., the pitch line velocity (PLV) of the bearing is greater than 65 m/s). As a non-limiting example, the lubrication system disclosed herein provides for 0.1% to 0.3% of efficiency for every 0.2% windage/power ratio. For example, if the windage generated by a lubrication system without the benefit of the present disclosure is 0.2% of the total amount of power that passes through the gear assembly, the lubrication system provides for a 0.1% to 0.3% increase of efficiency in the gear assembly as compared to lubrication systems without the benefit of the present disclosure. Therefore, the lubrication system disclosed herein provides for increased gear performance, and, thus, decreased engine fuel consumption, gear assembly weight, and overall engine weight, as compared to gear assemblies and engines without the benefit of the present disclosure.

Referring now to the drawings, FIG. 1 is a schematic cross-sectional diagram of a turbine engine 10, taken along a longitudinal centerline axis 12 of the turbine engine 10, according to the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal energy and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and/or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines. Even further still, aspects of the present disclosure can be utilized in any suitable system or assembly including gearing.

Figure 2:
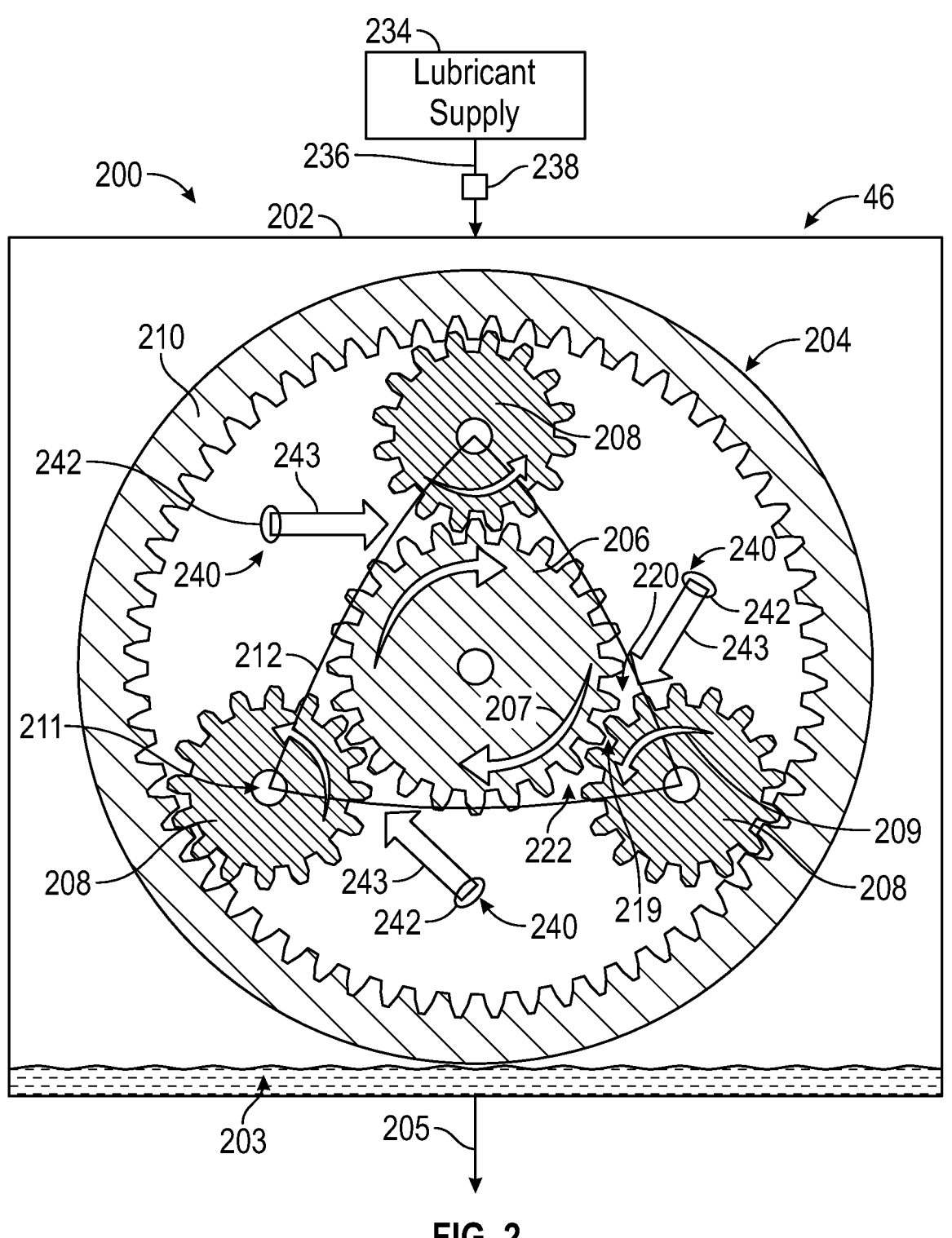
FIG. 2 is a schematic axial end cross-sectional view of a lubrication system for a gear assembly, taken at detail 2-2 in FIG. 1, according to the present disclosure.

FIG. 2 is a schematic axial end cross-sectional view of a lubrication system 200 for the gearbox assembly 46, taken at detail 2-2 in FIG. 1, according to the present disclosure. The gearbox assembly 46 includes a housing 202 (e.g., shown schematically in FIG. 2), a sump 203 (shown schematically in FIG. 2), and a gear assembly 204. The sump 203 is a reservoir within the housing 202 that collects and stores lubricant that drains from the gear assembly 204 or from the bearings of the gear assembly 204. The sump 203 includes a sump line 205 for draining the lubricant from the sump 203.

The gear assembly 204 includes a first gear 206, one or more second gears 208, and a third gear 210. In FIG. 2, the first gear 206 is a sun gear, the one or more second gears 208 are planet gears, and the third gear 210 is a ring gear. The gear assembly 204 is a star type or a rotating ring gear type gear assembly (e.g., the third gear 210 is rotating and a planet carrier 212 (shown schematically in FIG. 2) is fixed and stationary). In such an arrangement, the fan 38 (FIG. 1) is driven by the third gear 210. In this way, the third gear 210 is an output of the gear assembly 204. However, other suitable types of gear assemblies may be employed. In one non-limiting embodiment, the gear assembly 204 is a planetary arrangement, in which the third gear 210 is held fixed, with the planet carrier 212 allowed to rotate. In such an arrangement, the fan 38 is driven by the planet carrier 212. In this way, the one or more second gears 208 (e.g., the planet carrier 212) are the output of the gear assembly 204. In another non-limiting embodiment, the gear assembly 204 may be a differential gear assembly in which the third gear 210 and the planet carrier 212 are both allowed to rotate.

An input shaft 230 (FIG. 3) is coupled to the first gear 206. The input shaft 230 is coupled to the turbine section 27 (FIG. 1). For example, the input shaft 230 can be coupled to the LP shaft 36 (FIG. 1). In some embodiments, the input shaft 230 forms a single, unitary component with the LP shaft 36. Radially outward of the first gear 206, and intermeshing therewith, is the one or more second gears 208 that are coupled together and supported by the planet carrier 212 (shown schematically). The first gear 206 and a respective second gear 208 are intermeshed at a mesh 219. The planet carrier 212 supports and constrains the one or more second gears 208 such that the one or more second gears 208 are enabled to rotate about its own corresponding axis without rotating about the periphery of the first gear 206. Radially outwardly of the one or more second gears 208, and intermeshing therewith, is the third gear 210, which is an annular ring gear. The third gear 210 is coupled via an output shaft 232 (FIG. 3) to the fan 38 (FIG. 1) and rotates to drive rotation of the fan 38 (FIG. 1) about the longitudinal centerline axis 12. For example, the output shaft 232 is coupled to the fan shaft 45 (FIG. 1). In some embodiments, the output shaft 232 forms a single, unitary component with the fan shaft 45.

In operation, the LP shaft 36 (FIG. 1) rotates and causes the input shaft 230 (FIG. 3) to rotate, and the input shaft 230 causes the first gear 206 to rotate in a first gear rotation direction 207. The first gear 206, being intermeshed with the one or more second gears 208, causes the one or more second gears 208 to rotate in a second gear rotation direction 209 about their corresponding axis of rotation. The second gear rotation direction 209 is opposite of the first gear rotation direction 207. In the embodiment of FIG. 2, the first gear rotation direction 207 is clockwise and the second gear rotation direction 209 is counterclockwise. The rotation directions, however, can be any direction, as desired. For example, the first gear rotation direction 207 can be counterclockwise and the second gear rotation direction 209 can be clockwise. A location at which the gear teeth of the first gear 206 and the gear teeth of the one or more second gears 208 begins to intermesh at the mesh 219 as the gears rotate is referred to as an in-mesh side 220. A location at which the gear teeth of the first gear 206 separate from the gear teeth of the one or more second gears 208 (e.g., separate from the mesh 219) as the gears rotate is referred as an out-of-mesh side 222. The one or more second gears 208 each includes one or more bearings 211 disposed within the one or more second gears 208 and coupled to the planet carrier 212 such that the one or more second gears 208 rotate with respect to the one or more bearings 211. The third gear 210 is stationary in the embodiment of the FIG. 2. In embodiments in which the third gear 210 also rotates, the third gear 210 rotates in a third gear rotation direction that is opposite of the second gear rotation direction 209. For example, the third gear rotation direction is clockwise. The third gear rotation direction, however, can be counterclockwise. The mesh between the gear teeth of the one or more second gears 208 and the third gear 210 also includes an in-mesh side and an out-of-mesh side.

The lubrication system 200 includes a lubricant supply 234, a lubricant supply line 236, a lubricant pump 238, and one or more lubricant injectors 240 for supplying lubricant to the gear assembly 204. The lubricant supply 234 includes a lubricant tank for storing lubricant (e.g., oil) therein and supplies the lubricant to the gear assembly 204 through the lubricant supply line 236. The one or more lubricant injectors 240 are in fluid communication with the lubricant supply line 236 such that the lubricant supply 234 supplies the lubricant to the one or more lubricant injectors 240 through the lubricant supply line 236. The lubricant pump 238 pumps the lubricant from the lubricant supply 234 to the one or more lubricant injectors 240 through the lubricant supply line 236 for supplying the lubricant to the gear assembly 204. In some embodiments, the lubrication system 200 supplies the lubricant from the lubricant supply 234 to the one or more lubricant injectors 240 without a lubricant pump, for example, by gravity or by centrifugal force due to rotation of the planet carrier 212 in the planetary configuration of the gear assembly 204. The lubricant drains from the gear assembly 204 and into the sump 203. The lubricant in the sump 203 is drained from the sump 203 through the sump line 205. For example, the sump line 205 can be fluidly coupled to the lubricant supply 234, and the lubricant pump 238 (or a separate sump pump) pumps the lubricant from the sump 203 through the sump line 205 and re-circulates the lubricant to the lubricant supply 234. In this way, the lubricant can be re-used to lubricate the gears of the gear assembly 204, the bearings of the gear assembly 204, other components of the gearbox assembly 46, or other components of the turbine engine 10 (FIG. 1).

The one or more lubricant injectors 240 include one or more first lubricant outlets 242 for supplying the lubricant to gears of the gear assembly 204. For example, the one or more first lubricant outlets 242 are positioned to supply a first portion of lubricant 243 to the mesh 219 of the first gear 206 and the one or more second gears 208. In this way, the first portion of lubricant 243 lubricates and cools the meshing area of the first gear 206 and the one or more second gears 208 and removes heat due to friction between the gear teeth of the first gear 206 and the gear teeth of the one or more second gears 208, as detailed further below. The one or more first lubricant outlets 242 include orifices (e.g., holes) disposed through the one or more lubricant injectors 240 for directing the first portion of lubricant 243 from the one or more lubricant injectors 240 therethrough to supply the first portion of lubricant 243 to the mesh 219 of the first gear 206 and the one or more second gears 208. In some embodiments, the one or more first lubricant outlets 242 can be converging nozzles to increase a flow speed of the lubricant therethrough. In some embodiments, the one or more first lubricant outlets 242 can be diverging nozzles to decrease the flow speed of the lubricant therethrough. In some embodiments, the one or more first lubricant outlets 242 are oriented to supply the first portion of lubricant 243 to the in-mesh side 220 (as shown in FIG. 2), to the out-of-mesh side 222, or to both the in-mesh side 220 and the out-of-mesh side 222.

A size (e.g., diameter) of the one or more first lubricant outlets 242, a number of the one or more first lubricant outlets 242, and/or a position of the one or more first lubricant outlets 242 on the one or more lubricant injectors 240 are selected to control a pressure loss within the one or more lubricant injectors 240, and, thus, the flow speed of the lubricant to the mesh 219 (e.g., to the in-mesh side 220, to the out-of-mesh side 222, or to both the in-mesh side 220 and the out-of-mesh side 222). The pressure loss is also based on a geometry (e.g., a size) of the one or more lubricant injectors 240. For example, the pressure loss within the one or more lubricant injectors 240 is controlled by selecting a particular size of the one or more lubricant injectors 240 or by selecting a particular size, a particular number, or particular positions of the one or more first lubricant outlets 242.

A total mass flow rate ($\dot{m}_{lubricant\_total}$) of the lubricant within the one or more lubricant injectors 240 is controlled by the lubricant pump 238. The total mass flow rate ($\dot{m}_{lubricant\_total}$) is a function of the power loss due to friction (F) and the power loss due to windage (W). In particular, the total mass flow rate ($\dot{m}_{lubricant\_total}$) is equal to a first mass flow rate ($\dot{m}_{lubricant\_friction}$) summed with a second mass flow rate ($\dot{m}_{lubricant\_windage}$). The first mass flow rate ($\dot{m}_{lubricant\_friction}$) is determined based on the power loss due to friction (F) and the second mass flow rate ($\dot{m}_{lubricant\_windage}$) is determined based on the power loss due to windage (W), as detailed further below.

The first mass flow rate ($\dot{m}_{lubricant\_friction}$) is a function of the power loss due to friction (F) at the mesh 219 (e.g., between the gear teeth of the first gear 206 and of the second gear 208), the specific heat capacity ($C_p$) of the lubricant, and the maximum temperature (dT) that the first gear 206 and the second gear 208 (e.g., at the mesh) can withstand before becoming damaged (e.g., based on material properties of the first gear 206 and the second gear 208). The first mass flow rate is given by relationship (1):

$$\dot{m}_{lubricant\_friction} = \frac{F}{(C_p * dT)} \tag{1}$$

The power loss due to the friction (F) is a function of the turbine engine size. The specific heat capacity ($C_p$) and the maximum delta temperature (dT) are functions of the lubricant type and the temperature generated within the gear assembly 204. In a non-limiting example, the power loss due to friction is in a range from one kilowatt to one hundred kilowatts (1 kW to 100 KW), the specific heat capacity ($C_p$) is in a range from one thousand Joules per kilogram Kelvin to three thousand Joules per kilogram Kelvin (1000 J/kg*K to 3000 J/kg*K), and the maximum delta temperature (dT) is from one degree Celsius to sixty degrees Celsius (1° C. to 60° C.). The first mass flow rate is in a range from zero point one kilograms per second to five kilograms per second (0.1 kg/s to 5 kg/s). The ranges provided herein are exemplary only, and the values of the friction, the specific heat capacity, the maximum delta temperature, and the first mass flow rate can vary from the ranges (e.g., higher or lower than the ranges) provided based on specific applications, lubricant types, or engine sizes.

Figure 3:
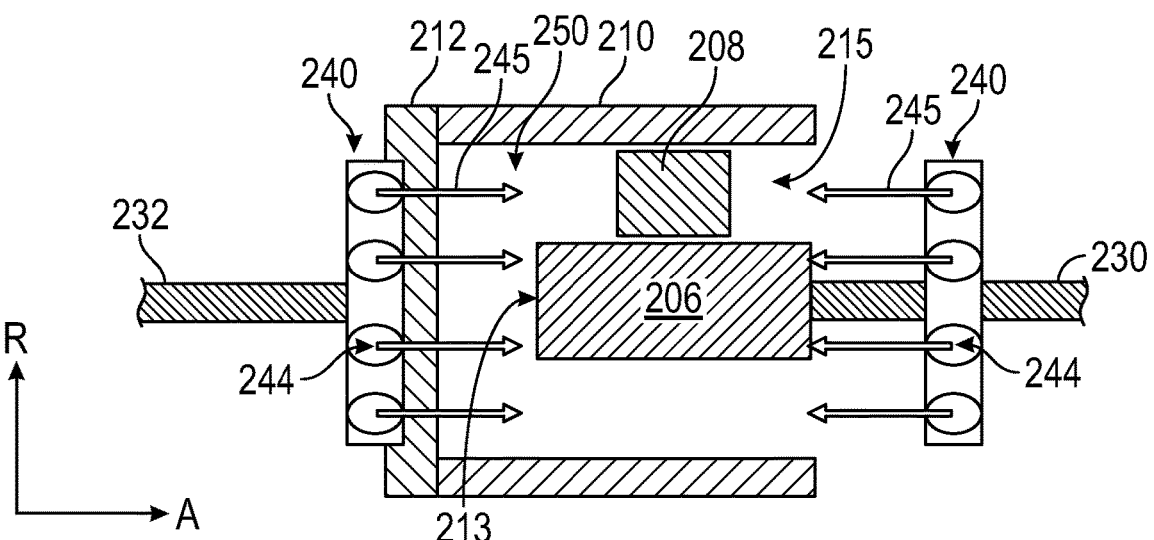
FIG. 3 is a schematic cross-sectional diagram of the gearbox assembly of FIG. 2, taken at detail 3 in FIG. 1, according to the present disclosure.

FIG. 3 is a schematic cross-sectional diagram of the gearbox assembly 46, taken at detail 3 in FIG. 1, according to the present disclosure. As shown in FIG. 3, the one more lubricant injectors 240 also include one or more second lubricant outlets 244. The one or more second lubricant outlets 244 are oriented and are positioned to supply a second portion of lubricant 245 to a location other than the mesh 219 (FIG. 2). For example, the one or more second lubricant outlets 244 are oriented and are positioned to supply the second portion of lubricant 245 to a first axial side 213 of the first gear 206, of the second gear 208, or of the first gear 206 and the second gear 208. The one or more second lubricant outlets 244 are also oriented and are positioned to supply the second portion of lubricant 245 to a second axial side 215 of the first gear 206, of the second gear 208 or of the first gear 206 and the second gear 208. In this way, the one or more second lubricant outlets 244 are oriented and are positioned to supply the second portion of lubricant 245 to a separate, and a different, location from the first portion of lubricant 243 (e.g., a location different than the mesh 219 between the first gear 206 and the second gear 208). The second axial side 215 is opposite the first axial side 213. The first axial side 213 is defined by a first lateral face of the first gear 206 and of the second gear 208, and the second axial side 215 is defined by a second lateral face of the first gear 206 and of the second gear 208.

The one or more second lubricant outlets 244 include orifices (e.g., holes) disposed through the one or more lubricant injectors 240 for operably directing the second portion of lubricant 245 from the one or more lubricant injectors 240 therethrough to supply the second portion of lubricant 245 to a gearbox cavity 250 within the gearbox assembly 46 (e.g., to the first axial side 213 and the second axial side 215 of the first gear 206 and the one or more second gears 208). In some embodiments, the one or more second lubricant outlets 244 can be converging nozzles to increase a flow speed of the lubricant therethrough. In some embodiments, the one or more second lubricant outlets 244 can be diverging nozzles to decrease the flow speed of the lubricant therethrough.

A size (e.g., diameter) of the one or more second lubricant outlets 244, a number of the one or more second lubricant outlets 244, and/or a position of the one or more second lubricant outlets 244 on the one or more lubricant injectors 240 are selected to control a pressure drop within the one or more lubricant injectors 240, and, thus, the flow speed of the lubricant to the location different than the mesh 219 (FIG. 2). The pressure loss is also based on a geometry (e.g., a size) of the one or more lubricant injectors 240. For example, the pressure loss within the one or more lubricant injectors 240 is controlled by selecting a particular size of the one or more lubricant injectors 240 or by selecting a particular size, a particular number, or particular positions of the one or more second lubricant outlets 244. The size of the one or more lubricant injectors 240 on which the one or more second lubricant outlets 244 are positioned can be different than the size of the one or more lubricant injectors 240 on which the one or more first lubricant outlets 242 are positioned. In some embodiments, the size, the number, or the position of the one or more second lubricant outlets 244 can be different than the size, the number, or the position of the one or more first lubricant outlets 242 (FIG. 2). In this way, the one or more lubricant injectors 240, the one or more first lubricant outlets 242, and the one or more second lubricant outlets 244 are selected based on a desired pressure loss within the one or more lubricant injectors 240 to achieve a desired flow split of the first portion of lubricant 243 to the mesh 219 and the second portion of lubricant 245 to the location other than the mesh 219.

The second mass flow rate ($\dot{m}_{lubricant\_windage}$) is a function of the power loss due to windage (W) of the first gear 206 and of the second gear 208 with the lubricant, the specific heat capacity ($C_p$) of the lubricant, and the maximum temperature (dT) that the first gear 206 and the second gear 208 can withstand before becoming damaged (e.g., based on material properties of the first gear 206 and the second gear 208). The second mass flow rate ($\dot{m}_{lubricant\_windage}$) is given by relationship (2):

$$\dot{m}_{lubricant\_windage} = \frac{W}{(C_p * dT)} \tag{2}$$

The power loss due to the windage is a function of the geometrical configuration of the gearbox assembly 46, the operating conditions of the gearbox assembly 46, and an amount of lubricant interacting with the gears. The specific heat capacity (Cp) and the maximum delta temperature (dT) are functions of the lubricant type and the temperature generated within the gear assembly 204. In a non-limiting example, the power loss due to friction is in a range from one kilowatt to one hundred kilowatts (1 kW to 100 KW), the specific heat capacity ($C_p$) is in a range from one thousand Joules per kilogram Kelvin to three thousand Joules per kilogram Kelvin (1000 J/kg*K to 3000 J/kg*K), and the maximum delta temperature (dT) is from one degree Celsius to sixty degrees Celsius (1° C. to 60° C.). The second mass flow rate is in a range from zero point one kilograms per second to five kilograms per second (0.1 kg/s to 5 kg/s). The ranges provided herein are exemplary only, and the values of the windage, the specific heat capacity, the maximum delta temperature, and the second mass flow rate can vary from the ranges (e.g., higher or lower than the ranges) provided based on specific applications, lubricant types, and engine sizes.

With reference to FIGS. 2 and 3, in operation, the gearbox assembly 46 operates as detailed above to transfer torque and power from the input shaft 230 to the output shaft 232. The lubrication system 200 supplies the lubricant from the lubricant supply 234 to the one or more lubricant injectors 240 through the lubricant supply line 236. The total mass flow rate ($\dot{m}_{lubricant\_total}$) is determined based on summing the first mass flow rate ($\dot{m}_{lubricant\_friction}$) and the second mass flow rate ($\dot{m}_{lubricant\_windage}$), as detailed above. The first mass flow rate ($\dot{m}_{lubricant\_friction}$) is determined by relationship (1) and the second mass flow rate ($\dot{m}_{lubricant\_windage}$) is determined by relationship (2). The lubricant pump 238 pumps the lubricant through the lubricant supply line 236 to supply the lubricant to the one or more lubricant injectors 240 at the total mass flow rate ($\dot{m}_{lubricant\_total}$) through the one or more lubricant injectors 240.

The one or more lubricant injectors 240 split the lubricant to the first portion of lubricant 243 and the second portion of lubricant 245. The one or more lubricant injectors 240 supply the first portion of lubricant 243 to the mesh 219 (e.g., to in-mesh side 220, to the out-of-mesh side 222, or to both the in-mesh side 220 and the out-of-mesh side 222) of the first gear 206 and the second gear 208 through the one or more first lubricant outlets 242. The amount of lubricant supplied to the mesh 219 is based on the size of the one or more lubricant injectors 240 and on the size, the number, and/or the position of the one or more first lubricant outlets 242, as detailed above.

The one or more lubricant injectors 240 supply the second portion of lubricant 245 to a location different than the mesh 219 through the one or more second lubricant outlets 244 (e.g., to a location that is not at the mesh 219). For example, the one or more lubricant injectors 240 supply the second portion of lubricant 245 within the gearbox cavity 250, such as by way of non-limiting example, to the first axial side 213, the second axial side 215 or a combination thereof, of the first gear 206, the second gear 208 or a combination thereof through the one or more second lubricant outlets 244. The amount of lubricant supplied to the one or more components is based the size of the one or more lubricant injectors 240 and on the size, the number, and/or the position of the one or more second lubricant outlets 244, as detailed above.

Alternatively, or additionally, the second portion of lubricant 245 can be supplied to one or more components of the gearbox assembly 46 including the input shaft 230, the output shaft 232, the planet carrier 212, the housing 202 of the gearbox assembly 46, the planet carrier 212, the one or more bearings 211 of the gear assembly 204, the sump 203 of the gearbox assembly 46, or some combination thereof. In this way, the one or more lubricant injectors 240 can be oriented to supply the second portion of lubricant 245 to other components in addition to, or instead of, the first axial side 213 and/or the second axial side 215. Further, while a power gearbox assembly being in an epicyclic configuration is detailed herein, the embodiments of the present disclosure can be used for other types of gearbox assemblies or gear assemblies including, for example, power gear trains, non-epicyclic gearbox assemblies, accessory gearbox assemblies (e.g., used to provide power to accessories of a turbine engine or of an aircraft or other vehicle), or any type of gear assembly.

Figure 4:
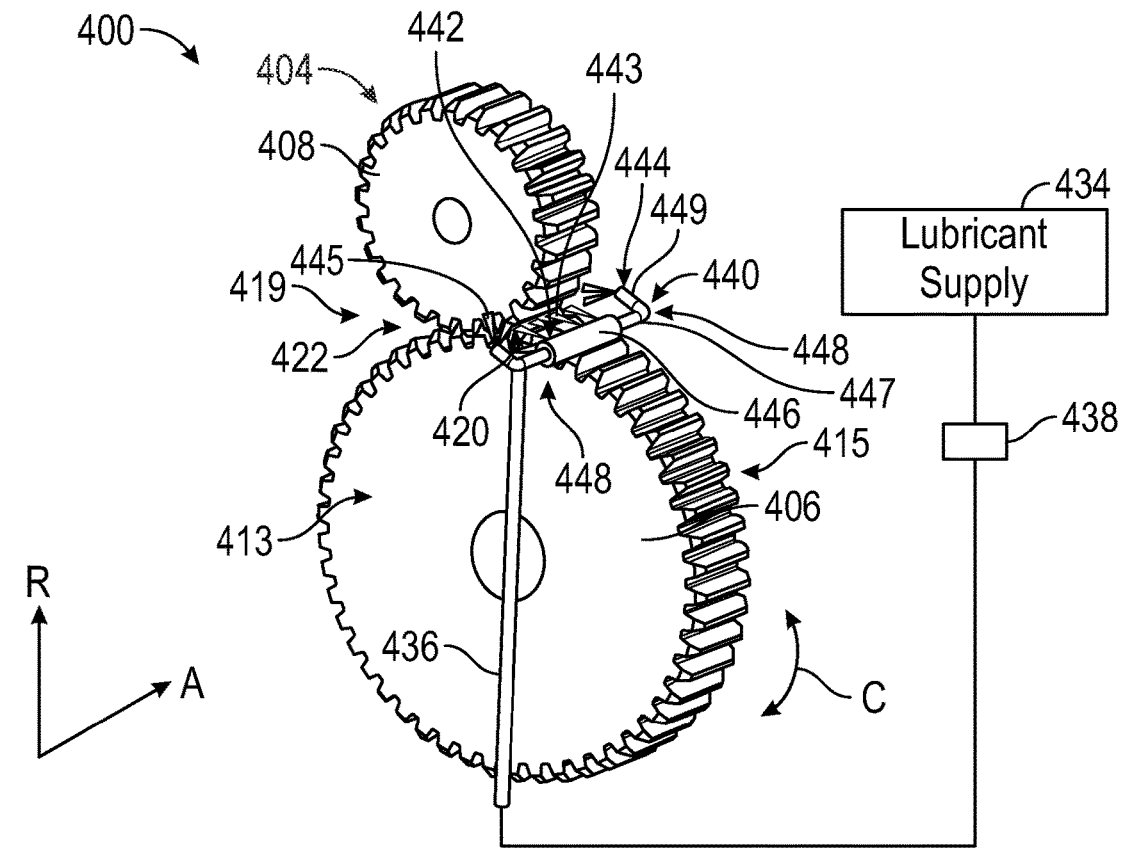
FIG. 4 is an enlarged schematic, side view of a portion of a lubrication system for a gear assembly, according to another embodiment.

FIG. 4 is an enlarged schematic, side view of a portion of a lubrication system 400 and a gear assembly 404, according to another embodiment. The embodiment of FIG. 4 and the embodiment of FIGS. 1 to 3 are not mutually exclusive. FIG. 4 shows that the gear assembly 404 includes a first gear 406 and a second gear 408. The first gear 406 and the second gear 408 include a first axial side 413 and a second axial side 415 opposite the first axial side 413. The first axial side 413 is defined by a first lateral face of the first gear 406 and of the second gear 408, and the second axial side 415 is defined by a second lateral face of the first gear 406 and of the second gear 408. The first gear 406 and the second gear 408 are intermeshed at a mesh 419. The mesh 419 includes an in-mesh side 420 and an out-of-mesh side 422. The gear assembly 404 can include any number of gears or any configuration, as desired.

The lubrication system 400 includes a lubricant supply 434, a lubricant supply line 436, a lubricant pump 438, and one or more lubricant injectors 440. The one or more lubricant injectors 440 are in fluid communication with the lubricant supply 434 through the lubricant supply line 436. The one or more lubricant injectors 440 include one or more first lubricant outlets 442 and one or more second lubricant outlets 444. The one or more first lubricant outlets 442 are oriented and are positioned to supply a first portion of lubricant 443 to the mesh 419. For example, the one or more first lubricant outlets 442 are oriented and are positioned to supply the first portion of lubricant 443 to the mesh 419 (e.g., to the in-mesh side 420, to the out-of-mesh side 422, or to both the in-mesh side 420 and the out-of-mesh side 422).

The one or more second lubricant outlets 444 are oriented and are positioned to supply a second portion of lubricant 445 to a location different than the mesh 419. For example, the one or more second lubricant outlets 444 are oriented and are positioned to supply the second portion of lubricant 445 to the first axial side 413 of the first gear 406, of the second gear 408, or of the first gear 406 and the second gear 408. The one or more second lubricant outlets 444 are also oriented and are positioned to supply the second portion of lubricant 445 to a second axial side 415 of the first gear 406, of the second gear 408 or of the first gear 406 and the second gear 408. In this way, the one or more second lubricant outlets 444 are oriented and are positioned to supply the second portion of lubricant 445 to a separate, and a different, location from the first portion of lubricant 443 (e.g., a location different than the mesh 419 between the first gear 406 and the second gear 408).

The one or more lubricant injectors 440 include one or more first lubricant injector portions 446 and one or more second lubricant injector portions 448. The one or more first lubricant injector portions 446 extend laterally (e.g., axially) across the first gear 406 and the second gear 408. The one or more first lubricant outlets 442 are disposed in the one or more first lubricant injector portions 446 and are oriented to supply the lubricant to the mesh 419 of the first gear 406 and the second gear 408 (e.g., on the in-mesh side 420). For example, the one or more first lubricant outlets 442 are oriented to supply the lubricant circumferentially (e.g., radially and/or tangentially) from the one or more first lubricant injector portions 446. The one or more first lubricant outlets 442 are spaced axially along the one or more first lubricant injector portions 446.

The one or more second lubricant injector portion 448 each includes one or more axially extending portions 447 and one or more tangentially extending portions 449. In FIG. 4, the one or more second lubricant injector portions 448 include two second lubricant injector portions 448 such that there are two axially extending portions 447 and two tangentially extending portions 449 (e.g., one of each on each axial side of the first gear 406 and of the second gear 408). The one or more axially extending portions 447 extend axially from the first lubricant injector portion 446. The one or more tangentially extending portions 449 extend generally tangentially with respect to a circumferential direction C from the one or more axially extending portions 447. In this way, there is a respective second lubricant injector portion 448 oriented and positioned on the first axial side 413 of the first gear 406 and the second gear 408, and a respective second lubricant injector portion 448 positioned on the second axial side 415 of the first gear 406 and the second gear 408. Each of the one or more tangentially extending portions 449 includes the one or more second lubricant outlets 444 that are spaced radially or circumferentially along the respective tangentially extending portion 449. In this way, the one or more second lubricant injector portions 448 of the one or more lubricant injectors 440 are oriented to supply the second portion of lubricant 445 to the location different than the mesh 419. For example, one or more second lubricant injector portions 448 are oriented to supply the second portion of lubricant 445 to the first axial side 413 and to the second axial side 415.

A size of the one or more first lubricant injector portions 446 and a size of the one or more second lubricant injector portions 448 is selected based on a desired pressure loss within the one or more first lubricant injector portions 446 and the one or more lubricant injector portions 448 to provide a desired flow split of the first portion of lubricant 443 and the second portion of lubricant 445. In some embodiments, a size (e.g., diameter) of the one or more first lubricant outlets 442, a number of the one or more first lubricant outlets 442, and/or a position of the one or more first lubricant outlets 442 on the first lubricant injector portion 446 are selected to provide the desired flow split of the first portion of lubricant 443 to the mesh 419, as detailed above with respect to FIGS. 2 and 3. Similarly, a size (e.g., diameter) of the one or more second lubricant outlets 444, a number of the one or more second lubricant outlets 444, and/or a position of the one or more second lubricant outlets 444 on the second lubricant injector portion 448 are selected to provide the desired flow split of the second portion of lubricant 445 to the location other than the mesh 419.

In some embodiments, the one or more second lubricant injector portions 448 are separate from the one or more first lubricant injector portions 446 such that the one or more second lubricant injector portions 448 are not extended from the one or more first lubricant injector portions 446 and the one or more second lubricant injector portions 448 are coupled to the lubricant supply 434 separately from the one or more first lubricant injector portions 446.

The lubrication system 400 and the gear assembly 404 operate substantially similarly to the lubrication system 200 and the gear assembly 204 of FIGS. 2 and 3. In this way, the lubrication system 400 provides a total mass flow rate (m) based on the first mass flow rate (m1) and the second mass flow rate (m2), as detailed above. The one or more first lubricant injector portions 446 supply the first portion of lubricant 443 to the mesh 419 through the one or more first lubricant outlets 442. The one or more second lubricant injector portions 448 supply the second portion of lubricant 445 to the location different than the mesh 419 through the one or more second lubricant outlets 444. The one or more lubricant injectors 440 can include any number of first lubricant injector portions 446 and/or second lubricant injector portions 448 for providing the desired flow split of the first portion of lubricant 443 and the second portion of lubricant 445, respectively. The one or more second lubricant injector portions 448 can include any number of axially extending portions 447 and/or any number of tangentially extending portions 449 for providing the second portion of lubricant 445.

The lubrication systems 200, 400 detailed here provide for separately controlling the amount of lubricant to the mesh 219, 419 and to other areas or other components of the gearbox assembly 46 or of the turbine engine 10 (FIG. 1). The one or more lubricant injectors 240, 440 supply the first portion of lubricant 243, 443 to the mesh 219, 419, and separately supply the second portion of lubricant 245, 445 to a location different than the mesh 219, 419 to avoid or to minimize interaction of the second portion of lubricant 245, 445 with the mesh 219, 419. For example, the second portion of lubricant 245, 445 is supplied to other components or areas of the gearbox assembly 46 (e.g., the gearbox cavity 250, the input shaft 230, the output shaft 232, the planet carrier 212, the housing 202 of the gearbox assembly 46, the one or more bearings 211 of the gearbox assembly 46, the sump 203 of the gearbox assembly 46, and/or other components of the gearbox assembly 46). In this way, the lubrication systems 200, 400 provide for reducing an overall amount of lubricant needed to be supplied to the mesh 219, 419 of the first gear 206, 406 and the second gear 208, 408 to adequately lubricate and to cool the area of the mesh 219, 419, while reducing the amount of power losses from the windage (e.g., due to the reduced amount of lubricant), as compared to lubrication systems without the benefit of the present disclosure. In this way, the total mass flow rate of the lubricant through the one or more lubricant injectors 240, 440 is reduced as compared to lubrication systems without the benefit of the present disclosure. Accordingly, the lubrication systems 200, 400 provide for increased efficiency of the gear assembly 204, 404 as compared to gear assemblies without the benefit of the present disclosure, as detailed above.

Further, when used in an engine (e.g., a turbine engine), the lubrication systems 200, 400 provide for an increase in engine efficiency and reduced fuel consumption of the engine as compared to lubrication systems without the benefit of the present disclosure. The lubrication systems 200, 400 provide the above benefits for all engine platforms and industrial systems with high speed and large dimension gearboxes. Accordingly, the amount of lubricant provided to the gear assembly 204, 404, and, therefore, the amount of power loss from friction and windage, is reduced as compared to gear assemblies without the benefit of the present disclosure. The present disclosure is applicable to any type of gear assembly, and is particularly applicable to epicyclic gear trains.

Further aspects of the present disclosure are provided by the subject matter of the following clauses.

A lubrication system for a gear assembly including a first gear and a second gear that mesh with each other at a mesh. The lubrication system comprises one or more first lubricant outlets directed to the mesh, the one or more first lubricant outlets supplying a first portion of lubricant to the mesh, and one or more second lubricant outlets directed to a location that is different than the mesh, the one or more second lubricant outlets supplying a second portion of lubricant to the location different than the mesh.

The lubrication system of the preceding clause, further comprising a lubricant supply that supplies the lubricant to the one or more lubricant injectors.

The lubrication system of any preceding clause, the one or more first lubricant outlets being oriented to supply the first portion of lubricant to an in-mesh side of the mesh.

The lubrication system of any preceding clause, the one or more lubricant injectors including one or more first lubricant injector portions, and the one or more first lubricant outlets being positioned on the one or more first lubricant injector portions.

The lubrication system of any preceding clause, the one or more lubricant injectors including one or more second lubricant injector portions, and the one or more second lubricant outlets being positioned on the one or more second lubricant injector portions.

The lubrication system of any preceding clause, a size of the one or more lubricant injectors being determined to provide the lubricant at a total mass flow rate within the one or more lubricant injectors.

The lubrication system of the preceding clause, the size of one or more lubricant injectors being based on a flow split between the first portion of lubricant and the second portion of lubricant.

The lubrication system of any preceding clause, the total mass flow rate being determined based on a first mass flow rate and a second mass flow rate.

The lubrication system of any preceding clause, the first mass flow rate being a function of a power loss due to friction at the mesh of the first gear and the second gear, a specific heat capacity of the lubricant, and a maximum delta temperature of the first gear and the second gear.

The lubrication system of any preceding clause, the second mass flow rate being a function of a power loss due to windage from an interaction of the gear assembly with the lubricant, a specific heat capacity of the lubricant, and a maximum delta temperature of the first gear and the second gear.

The lubrication system of any preceding clause, an amount of lubricant of the first portion of lubricant supplied to the mesh being different than an amount of lubricant of the second portion of lubricant supplied to the location different than the mesh.

The lubrication system of any preceding clause, the gear assembly including an epicyclic gear assembly including the first gear, the second gear, and a third gear, the first gear being a sun gear, the second gear being a planet gear, and the third gear being a ring gear.

The lubrication system of any preceding clause, the second portion of lubricant being supplied separately from the first portion of lubricant.

The lubrication system of any preceding clause, the location of the gear assembly that is different than the mesh includes one or more components of the gear assembly.

The lubrication system of any preceding clause, the one or more components including a gearbox cavity of the gear assembly.

The lubrication system of any preceding clause, the first lubricant injector portion extending generally axially across the first gear and the second gear at the mesh of the first gear and the second gear, and the one or more first lubricant outlets being oriented on the first lubricant injector portion to supply the first portion of lubricant to the mesh.

The lubrication system of any preceding clause, the second lubricant injector portion extending generally tangentially with respect to a circumferential direction of the first gear and the second gear, and the one or more second lubricant outlets being oriented on the second lubricant injector portion to supply the second portion of lubricant to the one or more components of the gear assembly.

The lubrication system of any preceding clause, one or more second lubricant outlets including a number, a size, or a position that is different than a number, a size, or a position of the one or more first lubricant outlets.

The lubrication system of any preceding clause, the location that is different than the mesh including at least one of a first axial side of the first gear and the second gear or a second axial side of the first gear and the second gear.

The lubrication system of any preceding clause, the gear assembly including an input shaft and an output shaft.

The lubrication system of any preceding clause, the gear assembly being included in a gearbox assembly.

The lubrication system of any preceding clause, the gearbox assembly including a housing.

The lubrication system of any preceding clause, the gearbox assembly including a sump.

The lubrication system of any preceding clause, the gear assembly including one or more bearings disposed within the second gear.

The lubrication system of any preceding clause, the location that is different than the mesh including at least one of the input shaft, the output shaft, the housing, the sump, or the one or more bearings.

The lubrication system of any preceding clause, the second lubricant injector portion extending from the first lubricant injector portion.

The lubrication system of any preceding clause, the second lubricant injector portion including one or more axially extending portions and one or more tangentially extending portions.

The lubrication system of any preceding clause, the one or more axially extending portions extending generally axially from the first lubricant injector portion.

The lubrication system of any preceding clause, the one or more tangentially extending portions extending generally tangentially from the one or more axially extending portions.

The lubrication system of any preceding clause, the one or more first lubricant outlets being orifices disposed through the first lubricant injector portion.

The lubrication system of any preceding clause, the one or more second lubricant outlets being orifices disposed through the second lubricant injector portion.

The lubrication system of any preceding clause, the first mass flow rate being equal to $F/(C_p*dT)$, F being the power loss due to friction, Cp is the specific heat capacity of the lubricant, and dT is the maximum delta temperature of the first gear and the second gear.

The lubrication system of any preceding clause, the second mass flow rate being equal to $W/(C_p*dT)$, W being the power loss due to windage, Cp is the specific heat capacity of the lubricant, and dT is the maximum delta temperature of the first gear and the second gear.

An assembly comprising a lubrication system and a gear assembly. The gear assembly comprises a first gear and a second gear that mesh with each other at a mesh. The lubrication system comprises one or more first lubricant outlets directed to the mesh, the one or more first lubricant outlets supplying a first portion of lubricant to the mesh, and one or more second lubricant outlets directed to a location that is different than the mesh, the one or more second lubricant outlets supplying a second portion of lubricant to the location different than the mesh.

The assembly of the preceding clause, further comprising a lubricant supply that supplies the lubricant to the one or more lubricant injectors.

The assembly of any preceding clause, the one or more first lubricant outlets being oriented to supply the first portion of lubricant to an in-mesh side of the mesh.

The assembly of any preceding clause, the one or more lubricant injectors including one or more first lubricant injector portions, and the one or more first lubricant outlets being positioned on the one or more first lubricant injector portions.

The assembly of any preceding clause, the one or more lubricant injectors including one or more second lubricant injector portions, and the one or more second lubricant outlets being positioned on the one or more second lubricant injector portions.

The assembly of any preceding clause, a size of the one or more lubricant injectors being determined to provide the lubricant at a total mass flow rate within the one or more lubricant injectors.

The assembly of the preceding clause, the size of the one or more lubricant injectors being based on a flow split between the first portion of lubricant and the second portion of lubricant.

The assembly of any preceding clause, the total mass flow rate being determined based on a first mass flow rate summed with a second mass flow rate.

The assembly of any preceding clause, the first mass flow rate being a function of a power loss due to friction at the mesh of the first gear and the second gear, a specific heat capacity of the lubricant, and a maximum delta temperature of the first gear and the second gear.

The assembly of any preceding clause, the second mass flow rate being a function of a power loss due to windage from an interaction of the gear assembly with the lubricant, a specific heat capacity of the lubricant, and a maximum delta temperature of the first gear and the second gear.

The assembly of any preceding clause, an amount of lubricant of the first portion of lubricant supplied to the mesh being different than an amount of lubricant of the second portion of lubricant supplied to the location different than the mesh.

The assembly of any preceding clause, the gear assembly including an epicyclic gear assembly including the first gear, the second gear, and a third gear, the first gear being a sun gear, the second gear being a planet gear, and the third gear being a ring gear.

The assembly of any preceding clause, the second portion of lubricant being supplied separately from the first portion of lubricant.

The assembly of any preceding clause, the location of the gear assembly that is different than the mesh includes one or more components of the gear assembly.

The assembly of any preceding clause, the one or more components including a gearbox cavity of the gear assembly.

The assembly of any preceding clause, the first lubricant injector portion extending generally axially across the first gear and the second gear at the mesh of the first gear and the second gear, and the one or more first lubricant outlets being oriented on the first lubricant injector portion to supply the first portion of lubricant to the mesh.

The assembly of any preceding clause, the second lubricant injector portion extending generally tangentially with respect to a circumferential direction of the first gear and the second gear, and the one or more second lubricant outlets being oriented on the second lubricant injector portion to supply the second portion of lubricant to the one or more components of the gear assembly.

The assembly of any preceding clause, one or more second lubricant outlets including a number, a size, or a position that is different than a number, a size, or a position of the one or more first lubricant outlets.

The assembly of any preceding clause, the second mass flow rate being substantially equal to the first mass flow rate.

The assembly of any preceding clause, the location that is different than the mesh including at least one of a first axial side of the first gear and the second gear or a second axial side of the first gear and the second gear.

The assembly of any preceding clause, the gear assembly including an input shaft and an output shaft.

The assembly of any preceding clause, the gear assembly being included in a gearbox assembly.

The assembly of any preceding clause, the gearbox assembly including a housing.

The assembly of any preceding clause, the gearbox assembly including a sump.

The assembly of any preceding clause, the gear assembly including one or more bearings disposed within the second gear.

The assembly of any preceding clause, the location that is different than the mesh including at least one of the input shaft, the output shaft, the housing, the sump, or the one or more bearings.

The assembly of any preceding clause, the second lubricant injector portion extending from the first lubricant injector portion.

The assembly of any preceding clause, the second lubricant injector portion including one or more axially extending portions and one or more tangentially extending portions.

The assembly of any preceding clause, the one or more axially extending portions extending generally axially from the first lubricant injector portion.

The assembly of any preceding clause, the one or more tangentially extending portions extending generally tangentially from the one or more axially extending portions.

The assembly of any preceding clause, the one or more first lubricant outlets being orifices disposed through the first lubricant injector portion.

The assembly of any preceding clause, the one or more second lubricant outlets being orifices disposed through the second lubricant injector portion.

The assembly of any preceding clause, the first mass flow rate being equal to $F/(C_p*dT)$, F being the power loss due to friction, Cp is the specific heat capacity of the lubricant, and dT is the maximum delta temperature of the first gear and the second gear.

The assembly of any preceding clause, the second mass flow rate being equal to $W/(C_p*dT)$, W being the power loss due to windage, Cp is the specific heat capacity of the lubricant, and dT is the maximum delta temperature of the first gear and the second gear.

A turbine engine comprising a fan, a core turbine engine, a gear assembly, and a lubrication system. The gear assembly includes a first gear and a second gear that mesh with each other at a mesh. The lubrication system comprises one or more first lubricant outlets directed to the mesh, the one or more first lubricant outlets supplying a first portion of lubricant to the mesh, and one or more second lubricant outlets directed to a location that is different than the mesh, the one or more second lubricant outlets supplying a second portion of lubricant to the location different than the mesh.

The turbine engine of the preceding clause, further comprising a lubricant supply that supplies the lubricant to the one or more lubricant injectors.

The turbine engine of any preceding clause, the one or more first lubricant outlets being oriented to supply the first portion of lubricant to an in-mesh side of the mesh.

The turbine engine of any preceding clause, the one or more lubricant injectors including one or more first lubricant injector portions, and the one or more first lubricant outlets being positioned on the one or more first lubricant injector portions.

The turbine engine of any preceding clause, the one or more lubricant injectors including one or more second lubricant injector portions, and the one or more second lubricant outlets being positioned on the one or more second lubricant injector portions.

The turbine engine of any preceding clause, a size of the one or more lubricant injectors being determined to provide the lubricant at a total mass flow rate within the one or more lubricant injectors.

The turbine engine of the preceding clause, the size of the one or more lubricant injectors being based on a flow split between the first portion of lubricant and the second portion of lubricant.

The turbine engine of any preceding clause, the total mass flow rate being determined based on a first mass flow summed with a second mass flow rate.

The turbine engine of any preceding clause, the first mass flow rate being a function of a power loss due to friction at the mesh of the first gear and the second gear, a specific heat capacity of the lubricant, and a maximum delta temperature of the first gear and the second gear.

The turbine engine of any preceding clause, the second mass flow rate being a function of a power loss due to windage from an interaction of the gear assembly with the lubricant, a specific heat capacity of the lubricant, and a maximum delta temperature of the first gear and the second gear.

The turbine engine of any preceding clause, an amount of lubricant of the first portion of lubricant supplied to the mesh being different than an amount of lubricant of the second portion of lubricant supplied to the location different than the mesh.

The turbine engine of any preceding clause, the gear assembly including an epicyclic gear assembly including the first gear, the second gear, and a third gear, the first gear being a sun gear, the second gear being a planet gear, and the third gear being a ring gear.

The turbine engine of any preceding clause, the second portion of lubricant being supplied separately from the first portion of lubricant.

The turbine engine of any preceding clause, the location of the gear assembly that is different than the mesh including one or more components of the gear assembly.

The turbine engine of any preceding clause, the one or more components including a gearbox cavity of the gear assembly.

The turbine engine of any preceding clause, the first lubricant injector portion extending generally axially across the first gear and the second gear at the mesh of the first gear and the second gear, and the one or more first lubricant outlets being oriented on the first lubricant injector portion to supply the first portion of lubricant to the mesh.

The turbine engine of any preceding clause, the second lubricant injector portion extending generally tangentially with respect to a circumferential direction of the first gear and the second gear, and the one or more second lubricant outlets being oriented on the second lubricant injector portion to supply the second portion of lubricant to the one or more components of the gear assembly.

The turbine engine of any preceding clause, one or more second lubricant outlets including a number, a size, or a position that is different than a number, a size, or a position of the one or more first lubricant outlets.

The turbine engine of any preceding clause, the location that is different than the mesh including at least one of a first axial side of the first gear and the second gear or a second axial side of the first gear and the second gear.

The turbine engine of any preceding clause, the gear assembly including an input shaft and an output shaft.

The turbine engine of any preceding clause, the gear assembly being included in a gearbox assembly.

The turbine engine of any preceding clause, the gearbox assembly including a housing.

The turbine engine of any preceding clause, the gearbox assembly including a sump.

The turbine engine of any preceding clause, the gear assembly including one or more bearings disposed within the second gear.

The turbine engine of any preceding clause, the location that is different than the mesh including at least one of the input shaft, the output shaft, the housing, the sump, or the one or more bearings.

The turbine engine of any preceding clause, the second lubricant injector portion extending from the first lubricant injector portion.

The turbine engine of any preceding clause, the second lubricant injector portion including one or more axially extending portions and one or more tangentially extending portions.

The turbine engine of any preceding clause, the one or more axially extending portions extending generally axially from the first lubricant injector portion.

The turbine engine of any preceding clause, the one or more tangentially extending portions extending generally tangentially from the one or more axially extending portions.

The turbine engine of any preceding clause, the one or more first lubricant outlets being orifices disposed through the first lubricant injector portion.

The turbine engine of any preceding clause, the one or more second lubricant outlets being orifices disposed through the second lubricant injector portion.

The turbine engine of any preceding clause, the first mass flow rate being equal to $F/(C_p*dT)$, F being the power loss due to friction, Cp is the specific heat capacity of the lubricant, and dT is the maximum delta temperature of the first gear and the second gear.

The turbine engine of any preceding clause, the second mass flow rate being equal to $W/(C_p*dT)$, W being the power loss due to windage, Cp is the specific heat capacity of the lubricant, and dT is the maximum delta temperature of the first gear and the second gear.

A method of supplying lubricant via a lubrication system for a gear assembly. The gear assembly including a first gear and a second gear that mesh with each other at a mesh. The method comprising supplying, through one or more first lubricant outlets of one or more lubricant injectors, a first portion of lubricant to the mesh, the one or more first lubricant outlets being directed to the mesh; and supplying, through one or more second lubricant outlets of the one or more lubricant injectors, a second portion of lubricant to a location that is different than the mesh, the one or more second lubricant outlets being directed to the location of the gear assembly that is different than the mesh.

The method of the preceding clause, further comprising supplying, via a lubricant supply, the lubricant to the one or more lubricant injectors.

The method of any preceding clause, further comprising supplying, through the one or more first lubricant outlets of the one or more lubricant injectors, the first portion of lubricant to an in-mesh side of the mesh.

The method of any preceding clause, further comprising supplying the first portion of lubricant through the one or more first lubricant outlets positioned on one or more first lubricant injector portions of the one or more lubricant injectors.

The method of any preceding clause, further comprising supplying the second portion of lubricant through the one or more second lubricant outlets positioned on one or more second lubricant injector portions of the one or more lubricant injectors.

The method of any preceding clause, further comprising providing the lubricant at a total mass flow rate within the one or more lubricant injectors, a size of the one or more lubricant injectors being determined to provide the total mass flow rate.

The method of the preceding clause, the size of the one or more lubricant injectors being based on a flow split between the first portion of lubricant and the second portion of lubricant.

The method of any preceding clause, the total mass flow rate being determined based on a first mass flow rate summed with a second mass flow rate.

The method of any preceding clause, the first mass flow rate being a function of a power loss due to friction at the mesh of the first gear and the second gear, a specific heat capacity of the lubricant, and a maximum delta temperature of the first gear and the second gear.

The method of any preceding clause, the second mass flow rate being a function of a power loss due to windage from an interaction of the gear assembly with the lubricant, a specific heat capacity of the lubricant, and a maximum delta temperature of the first gear and the second gear.

The method of any preceding clause, an amount of lubricant of the first portion of lubricant supplied to the mesh being different than an amount of lubricant of the second portion of lubricant supplied to the location different than the mesh.

The method of any preceding clause, the second portion of lubricant being supplied separately from the first portion of lubricant.

The method of any preceding clause, supplying the second portion of lubricant to the location of the gear assembly that is different than the mesh including supplying, through the one or more second lubricant outlets, the second portion of lubricant to a gearbox cavity of the gear assembly.

The method of any preceding clause, the gear assembly including an epicyclic gear assembly including the first gear, the second gear, and a third gear, the first gear being a sun gear, the second gear being a planet gear, and the third gear being a ring gear.

The method of any preceding clause, the location of the gear assembly that is different than the mesh including at least one of a first axial side of the first gear and the second gear or a second axial side of the first gear and the second gear.

The method of any preceding clause, the gear assembly including an input shaft and an output shaft.

The method of any preceding clause, the gear assembly being included in a gearbox assembly.

The method of any preceding clause, the gearbox assembly including a housing.

The method of any preceding clause, the gearbox assembly including a sump.

The method of any preceding clause, the gear assembly including one or more bearings disposed within the second gear.

The method of any preceding clause, the location of the gear assembly that is different than the mesh including at least one of the input shaft, the output shaft, the housing, the sump, or the one or more bearings.

The method of any preceding clause, the second lubricant injector portion extending from the first lubricant injector portion.

The method of any preceding clause, the second lubricant injector portion including one or more axially extending portions and one or more tangentially extending portions.

The method of any preceding clause, the one or more axially extending portions extending generally axially from the first lubricant injector portion.

The method of any preceding clause, the one or more tangentially extending portions extending generally tangentially from the one or more axially extending portions.

The method of any preceding clause, the one or more first lubricant outlets being orifices disposed through the first lubricant injector portion.

The method of any preceding clause, the one or more second lubricant outlets being orifices disposed through the second lubricant injector portion.

The method of any preceding clause, the first mass flow rate being equal to $F/(C_p*dT)$, F being the power loss due to friction, $C_p$ is the specific heat capacity of the lubricant, and dT is the maximum delta temperature of the first gear and the second gear.

The method of any preceding clause, the second mass flow rate being equal to $W/(C_p*dT)$, W being the power loss due to windage, $C_p$ is the specific heat capacity of the lubricant, and dT is the maximum delta temperature of the first gear and the second gear.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a gear assembly including a first gear and a second gear that mesh with each other at a mesh, the lubrication system comprising:
   a lubricant supply line that directs a lubricant therethrough; and
   a lubricant injector in fluid communication with the lubricant supply line, the lubricant injector including:
      one or more first lubricant injector portions extending axially across the first gear and the second gear and spaced from the gear assembly, wherein the one or more first lubricant injector portions include one or more first lubricant outlets directed to the mesh, the one or more first lubricant outlets supplying a first portion of lubricant from the lubricant supply line directly to the mesh; and
      one or more second lubricant injector portions extending from the one or more first lubricant injector portions and to a location that is different than the mesh, wherein the one or more second lubricant injector portions include one or more second lubricant outlets directed to the location that is different than the mesh, the one or more second lubricant outlets supplying a second portion of lubricant from the lubricant supply line to the location different than the mesh, the location that is different than the mesh including at least one of a first axial side of the first gear and the second gear, a second axial side of the first gear and the second gear, an input shaft of the gear assembly, an output shaft of the gear assembly, a housing of the gear assembly, a sump, or one or more bearings.

2. The lubrication system of claim 1, wherein the one or more first lubricant outlets are oriented to supply the first portion of lubricant to an in-mesh side of the mesh.

3. The lubrication system of claim 1, wherein a size of the lubricant injector is determined to provide the lubricant at a total mass flow rate within the lubricant injector.

4. The lubrication system of claim 3, wherein the size of the lubricant injector is based on a flow split between the first portion of lubricant and the second portion of lubricant.

5. The lubrication system of claim 3, wherein the total mass flow rate is determined based on a first mass flow rate summed with a second mass flow rate.

6. The lubrication system of claim 5, wherein the first mass flow rate is a function of a power loss due to friction at the mesh of the first gear and the second gear, a specific heat capacity of the lubricant, and a maximum delta temperature of the first gear and the second gear.

7. The lubrication system of claim 5, wherein the second mass flow rate is a function of a power loss due to windage from an interaction of the gear assembly with the lubricant, a specific heat capacity of the lubricant, and a maximum delta temperature of the first gear and the second gear.

8. A method of supplying lubricant via the lubrication system of claim 1, the method comprising:

supplying, through the one or more first lubricant outlets of the one or more first lubricant injector portions, the first portion of lubricant from the lubricant supply line directly to the mesh; and supplying, through the one or more second lubricant outlets of the one or more second lubricant injector portions, the second portion of lubricant from the lubricant supply line to the location that is different than the mesh.

9. The method of claim 8, further comprising supplying, through the one or more first lubricant outlets of the lubricant injector, the first portion of lubricant to an in-mesh side of the mesh.

10. The method of claim 8, further comprising providing the lubricant at a total mass flow rate within the lubricant injector, wherein a size of the lubricant injector is determined to provide the total mass flow rate.

11. The method of claim 10, wherein the size of the lubricant injector is based on a flow split between the first portion of lubricant and the second portion of lubricant.

12. The method of claim 10, wherein the total mass flow rate is determined based on a first mass flow rate summed with a second mass flow rate.

13. The method of claim 12, wherein the first mass flow rate is a function of a power loss due to friction at the mesh of the first gear and the second gear, a specific heat capacity of the lubricant, and a maximum delta temperature of the first gear and the second gear.

14. The method of claim 12, wherein the second mass flow rate is a function of a power loss due to windage from an interaction of the gear assembly with the lubricant, a specific heat capacity of the lubricant, and a maximum delta temperature of the first gear and the second gear.

15. The method of claim 8, wherein the location that is different than the mesh is at least one of the first axial side of the first gear and the second gear or the second axial side of the first gear and the second gear.

16. The method of claim 8, further comprising supplying, through the one or more first lubricant outlets of the lubricant injector, the first portion of lubricant to an out-of-mesh side of the mesh.

17. The lubrication system of claim 1, wherein the one or more first lubricant outlets are positioned to supply the first portion of lubricant circumferentially to the mesh.

18. The lubrication system of claim 1, wherein the location that is different than the mesh is at least one of the first axial side of the first gear and the second gear or the second axial side of the first gear and the second gear.

19. The lubrication system of claim 18, wherein the one or more second lubricant injector portions include one or more axially extending portions that extend axially from the one or more first lubricant injector portions and one or more tangentially extending portions that extend tangentially with respect to a circumferential direction of the gear assembly from the one or more axially extending portions, the one or more second lubricant outlets being positioned on the one or more tangentially extending portions to supply the lubricant to the at least one of the first axial side or the second axial side.

20. The lubrication system of claim 1, wherein the one or more first lubricant outlets are oriented to supply the first portion of lubricant to an out-of-mesh side of the mesh.

* * * * *